3,086,066
SEPARATION OF ACETYLENIC IMPURITIES FROM OLEFINS BY SELECTIVE POLYMERIZATION
Samuel Breiter, Brooklyn, N.Y., and Heinz Heinemann, Upper Montclair, N.J., assignors to The M. W. Kellogg Company, Jersey City, N.J., a corporation of Delaware
No Drawing. Filed Jan. 22, 1960, Ser. No. 4,012
11 Claims. (Cl. 260—677)

This invention relates to the separation of acetylenic impurities, and, in one of its aspects, relates to the separation of acetylenic impurities from mixtures thereof with monoolefins. Still more particularly, in this aspect, the invention relates to the separation of acetylene from mixtures thereof with monoolefins obtained by the pyrolysis of hydrocarbons, employing a novel method of selective or preferential polymerization.

In the commercial production of monoolefins, such as ethylene, propylene and other unsaturated compounds by the pyrolysis of hydrocarbons, such as naphtha feedstocks, it is important that the monoolefin be produced in a high degree of purity. It has been found, however, that the pyrolysis reaction also produces a high degree of acetylenic impurities, such as acetylene or methyl acetylene, whose presence impairs the efficacy of the monoolefin when subsequently subjected to further treatment to render the latter suitable for commercial utility. Of particular importance, is the necessity to remove these acetylenic impurities from monoolefins, such as ethylene and propylene, when it is desired to subject these monomeric compounds to polymerization treatments for the production of industrially valuable plastic materials.

At the present time, the aforementioned purification treatment for removal of acetylenic impurities is carried out commercially by catalytic hydrogenation processes, or by processes involving solvent extraction, for example, processes in which acetone is employed as a selective solvent extraction agent. It has been found, in some instances, however, that these processes are either too expensive or exhibit a relatively poor degree of selectivity in effecting the removal of undesired acetylenic impurities. Hence, prior to our invention, no efficient and commercially attractive method has been proposed for the separation of acetylenic impurities from mixtures thereof with monoolefins.

It is, therefore, an object of this invention to provide an improved method for the separation of acetylene from mixtures thereof with monoolefins.

Another object of the invention is to provide an improved method for the separation of acetylenes from mixtures thereof with monoolefins obtained by the pyrolysis of hydrocarbons.

Still another object of the invention is to provide an improved method for the separation of acetylenic impurities, such as acetylene or methyl acetylene from mixtures thereof with monoolefins such as ethylene or propylene, obtained by the pyrolysis of hydrocarbons, which is efficient and economically attractive from a commercial standpoint.

Other objects and advantages inherent in the invention will become apparent to those skilled in the art from the accompanying description and disclosure.

We have now found that an efficient and economical separation of acetylenic impurities from mixtures thereof with monoolefins, and particularly from such mixtures as are produced by the pyrolysis of hydrocarbons, can be obtained by a novel and improved method of selective or preferential polymerization, under the conditions more fully hereinafter described, employing a poisoned or deactivated catalyst which is highly selective in effecting polymerization of the acetylenic impurities, without causing substantial olefin polymerization to take place. In this manner, the disadvantages heretofore encountered in the processes of the prior art are obviated, resulting in the improvement in which substantially uncontaminated monoolefin can be readily and economically recovered from mixtures in which the aforementioned acetylenic impurities are present. In addition, another attractive feature of our improved process resides in the ability to periodically regenerate the catalyst employed, as desired, employing conventional regeneration procedures.

In carrying out the aforementioned selective or preferential polymerization treatment in which acetylenic impurities are removed from mixtures thereof with monoolefins, it has been found, as indicated above, that low-activity or deactivated catalysts selectively polymerize the acetylenic impurity without causing substantial olefin polymerization to take place. On a comparative basis, on the other hand, it was found that the same catalysts in a non-deactivated or non-poisoned state, by reason of their relatively high-activity, polymerize not only all of the acetylenic impurities present, but also substantially large quantities of the monoolefins, making separation or recovery of pure monoolefin, in good yield, impossible. To obtain such selective polymerization, the catalysts employed, in accordance with the present process, are those conventionally referred to as "cracking catalysts," such as those that are employed in catalytic cracking operations to effect the rearrangement and break-down of petroleum fractions. Most specifically, these cracking catalysts are of the type employed in breaking down higher molecular weight compounds, which normally boil above the gasoline boiling range. Examples of such catalysts include silica-alumina, silica-magnesia, silica-zirconia, alumina-boria and activated clays, and since these cracking catalysts are of the conventional type and well-known to those skilled in the art, further description thereof is believed to be unnecessary, except to state that, in general, any cracking catalyst may be successfully employed which has the ability to bring about polymerization of acetylenes.

In order to reduce the activity of the aforementioned catalysts or catalytic materials, poisoning or deactivation is obtained by treating or impregnating the catalyst with an alkali metal oxide, such as oxides of lithium, sodium, potassium, rubidium or cesium. For this purpose, alkali metal compounds may be satisfactorily employed in the form of nitrates, carbonates, hydroxides, sulfates and other compounds which decompose to the metal oxide under the conditions used in the preparation of the deactivated catalyst. In general, the deactivated or poisoned catalyst is prepared by contacting the untreated cracking catalyst with a solution of the alkali metal compound, for a period of time sufficient for penetration, coating or impregnation to take place. The thus-treated catalyst is next dried, then calcined at a relatively high temperature and is then ready for use. The quantity of alkali metal incorporated in the catalytic material is usually within the range of about 0.01 to about 5% by weight.

In the selective polymerization of the feed-stock, comprising acetylenic impurities and monoolefins, the treatment may be carried out either entirely in the gaseous or entirely in the liquid state, or in a mixed liquid and gaseous state, depending on the pressure and temperature employed. Selective polymerization, employing the deactivated or poisoned catalyst, is generally carried out at a temperature between about 400° F. and about 1000° F. to effect polymerization of the acetylenic impurities without causing a concomitant polymerization of the monoolefinic compounds to occur. In this respect, it has been found that if it is attempted to carry out the polymerization reaction at temperatures below approximately 400° F. the catalytic material is not sufficiently reactive and polymerization of the acetylenic components does not occur. On the other hand, it has been found that if polymerization is attempted to be carried out above approximately 1000° F., the formed acetylenic polymer breaks down and is converted back to the original unpolymerized acetylenic impurity. The most favorable results, within the above range, for obtaining selective polymerization of the acetylenic impurities, is preferably between about 700° F. and about 980° F. Insofar as the contact time of the catalytic material with the feed-stock is concerned, it has been found that, in general, in order for substantially complete selective polymerization of acetylenic impurities to occur, the contact time will normally vary inversely with the degree of the activity of the catalyst. In general, with respect to the polymerization temperatures required, it has been found that where the lower temperatures are employed within the above-mentioned ranges, longer contact time is also advantageously employed. The pressure under which the aforementioned selective polymerization reaction is carried out may be that obtained under ambient conditions, although it is also within the scope of the present invention to carry out the polymerization reaction at subatmospheric or superatmospheric conditions. In addition, it will also be noted that, if so desired, various diluents may be introduced into the polymerization mixture, e.g., nitrogen, helium, paraffins or cycloparaffins, and these diluents have been found to tend to moderate the polymerization conditions. The catalytic material, after the desired selective polymerization has taken place, can be regenerated by known regenerative procedures, to burn off the ploymer or coke deposits from the surface of the catalyst, and is thus ready for reuse. The polymerization reaction itself can be carried out in any commercial type of polymerization reaction vessel. The polymerization reaction may be carried out in any type of bed, such as a fluid bed, a fixed bed or a moving bed operation.

To illustrate the efficacy of the improved process of the present invention for effecting the selective removal of acetylenic compounds in mixtures thereof with monoolefins, the following data were obtained, in which cracking catalysts were employed in both a non-poisoned condition and also in a poisoned or deactivated condition.

The cracking catalyst employed in the experimental runs, comprised a silica-alumina catalyst, which was prepared by steaming a commercial silica-alumina cracking catalyst for a period of 20 hours at approximately 1500° F. This catalyst comprised 87% silica and 13% alumina. Poisoning or deactivation of this catalyst, was accomplished by impregnating the above-mentioned pelleted steamed silica-alumina catalyst with dilute water solutions of potassium hydroxide followed by drying of the catalyst at about 240° F., and then calcining at about 1000° F. for a period of 2 hours.

The experimental work was carried out by passing hydrocarbon feed-stocks, comprising methyl acetylene in propylene (as more fully hereinafter discussed) over the catalyst, contained in a glass reactor which was heated by means of an electric furnace equipped with suitable controls. In the fixed-bed reactions, the pelleted catalyst was centered in the reactor between two layers of alundum balls. In each instance, the system was purged with nitrogen for a period of 1 hour and the hydrocarbon mixture was fed to the reactor through a rotameter at controlled rates. The feed was passed over the catalyst for a period of 10 to 15 minutes in order to establish stable conditions. Thereafter, the run was continued for an additional period of approximately 15 to 20 minutes. During the run, product gas was passed through a condenser flask and two glass wool filled absorption bottles packed in ice, and followed by a wet-test meter. Meter readings were used as a measure of the feed. Spot samples were taken at intervals and a composite sample was collected by mercury displacement. The samples were analyzed by gas chromatography.

The feed-stock, in each instance, comprised from 1.0 to 1.6% methyl acetylene in propylene. This feed stock was passed over the aforementioned steamed silica-alumina catalyst at 925° F. As indicated above, both fluid and fixed bed operations were utilized and gaseous space rates were varied from 500 to 1100 vol./vol./hr. Under these conditions, as is shown in the following Table I, complete removal of methyl acetylene was achieved, however, it will be noted that this was accompanied by a loss of from 7 to 12% of the propylene charged. It will also be noted from Table I that a considerable quantity (6.9%) of $C_4$ and higher products were produced in addition to some propane. The space rate appeared to have very little effect upon the selectivity.

TABLE I

Reaction Over Silica-Alumina Catalyst

| Example | 1 | 2 | 3 |
| --- | --- | --- | --- |
| Feed, percent: | | | |
| Propylene | 98.24 | 98.2 | 98.5 |
| Methyl acetylene | 1.36 | 1.6 | 1.0 |
| Propane | 0.40 | 0.2 | 0.5 |
| Conditions: | | | |
| Temperature, °F | 925 | 925 | 935 |
| Gas Charge Rate, ml./min | 495 | 320 | 770 |
| Space Rate, vol./vol./hr | 780 | 500 | 1100 |
| Type Reactor | (1) | (1) | (2) |
| Products, percent: | | | |
| Methyl acetylene | 0 | 0 | 0 |
| Propylene | 88.1 | 91.0 | 90.1 |
| Propane | 2.2 | 1.6 | 1.4 |
| $CO_2$ | 0.31 | 0.1 | trace |
| $C_1$ | | 0.6 | |
| $C_2$ | 0.59 | 0.4 | 0.35 |
| $C_4$ sat | 0.37 | 0.4 | |
| $C_4$ unsat | 3.51 | 2.8 | 2.8 |
| $C_5$ and $C_6$ sat. and unsat | 4.99 | 3.0 | 5.38 |
| Percent coke on catalyst | 0.34 | 0.42 | 0.31 |
| Liquid product, percent of feed | 0.00 | 0.00 | 4.1 |
| Percent methyl acetylene removal | 100 | 100 | 100 |
| Percent selectivity | 89.7 | 92.7 | 87.8 |

[1] Fluid-bed.  [2] Fixed-bed.

As will be noted from Table I, the large quantity of $C_4$ and higher compounds formed when the hydrocarbon mixture was passed over the non-deactivated silica-alumina catalyst is indicative of the high level of activity of the catalyst for polymerization or decomposition reactions. Therefore, in order to reduce the loss of propylene and at the same time in order to maintain sufficient catalyst activity for methyl acetylene removal, the catalyst was poisoned by the addition of potassium in the manner discussed above. Table II, shown below, indicates the results obtained when 1% methyl acetylene in propylene was passed over the catalyst, previously poisoned with 1% potassium, in the manner previously discussed. At 925° F., atmospheric pressure and 550 vol./vol./hr., 50% of the methyl acetylene was removed with no loss of propylene, while at 980° F. and 300 vol./vol./hr., 72.2% of the methyl acetylene was removed with a selectivity of 99.6%. At 970° F., atmospheric pressure and 26.0 vol./vol./hr., methyl acetylene removal was almost complete, i.e., 96% removed. Selectivity in this case was 99.9%.

TABLE II

*Reaction Over Poisoned Catalyst (1% Potassium)*

| Example | 1 | 2 | 3 |
|---|---|---|---|
| Feed, percent: | | | |
| Propylene | 98.6 | 98.78 | 98.6 |
| Methyl acetylene | 1.0 | 0.72 | 1.0 |
| Propane | 0.4 | 0.5 | 0.4 |
| Conditions: | | | |
| Temperature, °F | 925 | 980 | 970 |
| Gas Charge Rate, ml./min | 385 | 209 | 175 |
| Space Rate, vol./vol./hr | 550 | 300 | 260 |
| Products, percent: | | | |
| Methyl acetylene | 0.5 | 0.2 | 0.04 |
| Propylene | 98.6 | 98.4 | 98.5 |
| Propane | 0.6 | 0.8 | 0.8 |
| $CO_2$ | 0.02 | 0.01 | 0.02 |
| $C_1$ | 0.00 | 0.00 | 0.00 |
| $C_2$ | 0.02 | 0.02 | 0.04 |
| $C_4$ sat | 0.01 | 0.04 | 0.05 |
| $C_4$ unsat | 0.15 | 0.35 | 0.30 |
| $C_5$ | 0.08 | 0.00 | 0.10 |
| Unidentified | 0.02 | 0.18 | 0.12 |
| Percent methyl acetylene removal | 50 | 72.2 | 96.0 |
| Percent selectivity | 100 | 99.6 | 99.9 |

As will be noted from the foregoing description and data, the efficacy of the present process in effecting the selective removal of acetylenic impurities from mixtures thereof with monoolefins, over the processes heretofore practiced, has been clearly demonstrated. It will be understood, of course, that the procedure described above is applicable not only to the selective removal of acetylenes from mixtures thereof with monoolefins, in general, but also to such specific mixtures which contain such acetylenic impurities as acetylene or methyl acetylene, and monoolefins such as ethylene or propylene, obtained not only by the pyrolysis of hydrocarbons, but also from any process in which such mixtures are produced. The catalyst, furthermore, may comprise not only potassium oxide, but any alkali metal oxide obtained from any of the aforementioned nitrates, carbonates, etc., or mixtures thereof. In addition, while a particular embodiment of the process of the present invention has been described for the purpose of illustration, it should be understood that various modifications and adaptations thereof which will be obvious to those skilled in the art may be made without departing from the spirit of the invention.

We claim:

1. A process for treating a mixture comprising an acetylene and a monoolefin which comprises contacting said mixture with a deactivated cracking catalyst selected from the group consisting of silica-magnesia, silica-zirconia and alumina-boria and containing an alkali metal oxide as a deactivating agent at a temperature between about 400° F. and about 1000° F. to selectively polymerize the acetylene, and separating monoolefin from the polymerized acetylene as a product of the process.

2. A process for treating a mixture comprising an acetylene and a monoolefin which comprises contacting said mixture with a deactivated cracking catalyst selected from the group consisting of silica-magnesia, silica-zirconia and alumina-boria and containing an alkali metal oxide as a deactivating agent at a temperature between about 700° F. and about 980° F. to selectively polymerize the acetylene, and separating monoolefin from the polymerized acetylene as a product of the process.

3. A process for treating a mixture comprising methyl acetylene and ethylene which comprises contacting said mixture with a deactivated cracking catalyst selected from the group consisting of silica-magnesia, silica-zirconia and alumina-boria and containing an alkali metal oxide as a deactivating agent at a temperature between about 400° F. and about 1000° F. to selectively polymerize methyl acetylene, and separating ethylene from the polymerized methyl acetylene as a product of the process.

4. A process for treating a mixture comprising methyl acetylene and propylene which comprises contacting said mixture with a deactivated cracking catalyst selected from the group consisting of silica-magnesia, silica-zirconia and alumina-boria and containing an alkali metal oxide as a deactivating agent at a temperature between about 400° F. and about 1000° F. to selectively polymerize methyl acetylene, and separating propylene from the polymerized methyl acetylene as a product of the process.

5. A process for treating a mixture comprising acetylene and ethylene which comprises contacting said mixture with a deactivated cracking catalyst selected from the group consisting of silica-magnesia, silica-zirconia and alumina-boria and containing an alkali metal oxide as a deactivating agent at a temperature between 400° F. and about 1000° F. to selectively polymerize acetylene, and separating ethylene from the polymerized acetylene as a product of the process.

6. A process for treating a mixture comprising acetylene and propylene which comprises contacting said mixture with a deactivated cracking catalyst selected from the group consisting of silica-magnesia, silica-zirconia and alumina-boria and containing an alkali metal oxide as a deactivating agent at a temperature between about 400° F. and about 1000° F. to selectively polymerize the acetylene, and separating propylene from the polymerization acetylene as a product of the process.

7. A process for treating a mixture comprising an acetylene and a monoolefin which comprises contacting said mixture with a deactivated cracking catalyst selected from the group consisting of silica-magnesia, silica-zirconia and alumina-boria and containing an alkali metal oxide as a deactivating agent in the presence of a diluent at a temperature between about 400° F. and about 1000° F. to selectively polymerize the acetylene, separating monoolefins from the polymerized acetylene as a product of the process, and regenerating said catalyst for further use in the process.

8. A process for treating a mixture comprising an acetylene and a monoolefin which comprises contacting the said mixture with a deactivated cracking catalyst selected from the group consisting of silica-magnesia, silica-zirconia and alumina-boria and containing an alkali metal oxide as a deactivating agent in the presence of a diluent at a temperature between about 400° F. and about 1000° F. to selectively polymerize the acetylene, separating monoolefins from the polymerized acetylene as a product of the process, and regenerating said catalyst for further use in the process.

9. The process of claim 1 in which the catalyst comprises silica-magnesia.

10. The process of claim 1 in which the catalyst comprises silica-zirconia.

11. The process of claim 1 in which the catalyst comprises alumina-boria.

References Cited in the file of this patent

UNITED STATES PATENTS

| | | |
|---|---|---|
| 1,836,927 | Linckh et al. | Dec. 15, 1931 |
| 2,775,634 | Nowlin | Dec. 25, 1956 |
| 2,814,653 | Hogan et al. | Nov. 26, 1957 |
| 2,851,504 | Hogan | Sept. 9, 1958 |

OTHER REFERENCES

Berkman et al.: "Catalysis," published by Reinhold Pub. Co. (New York), 1940 (pages 726–728 relied on).